Sept. 12, 1933.　　　J. L. SPENCE, JR　　　1,926,703
MAGAZINE FOR MOVING PICTURE CAMERAS
Filed March 14, 1931　　2 Sheets-Sheet 1
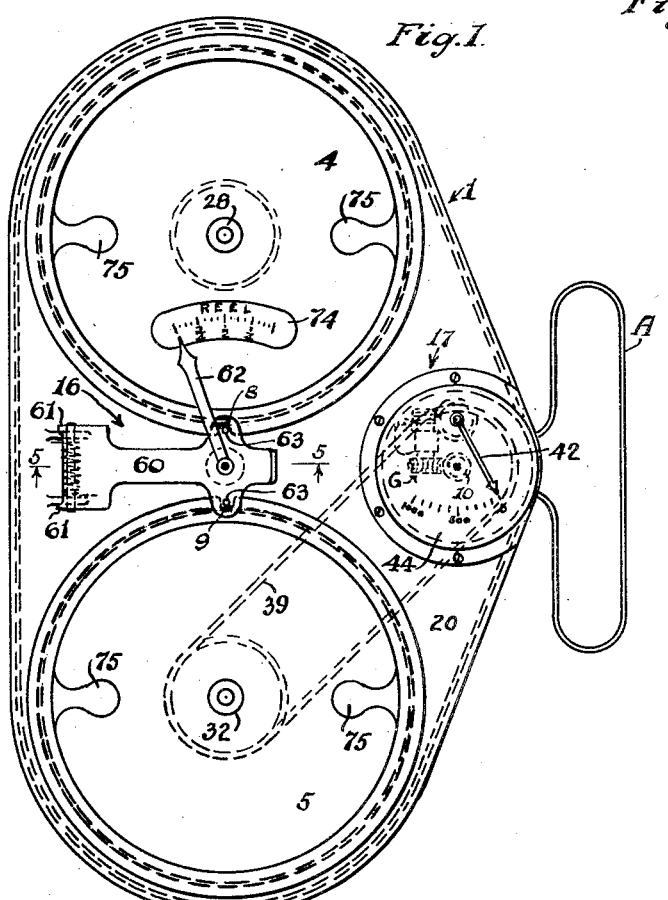
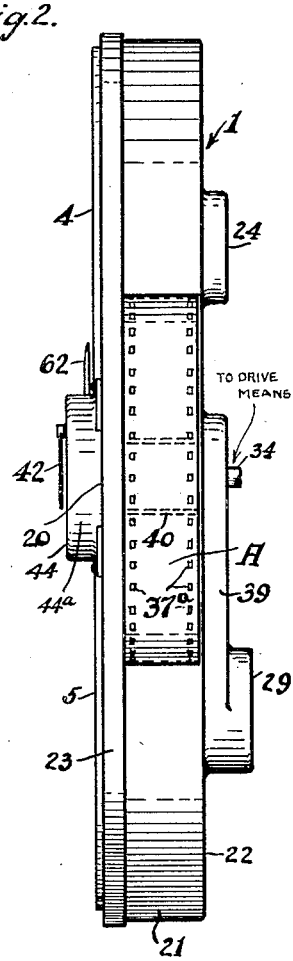
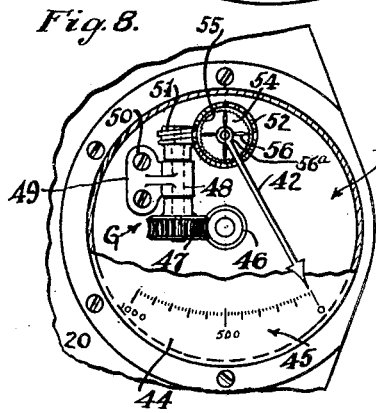
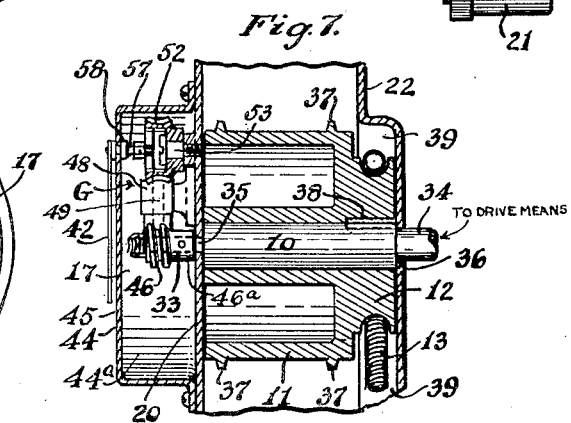
INVENTOR
John L. Spence Jr.,
BY
Harold D. Penney
ATTORNEY

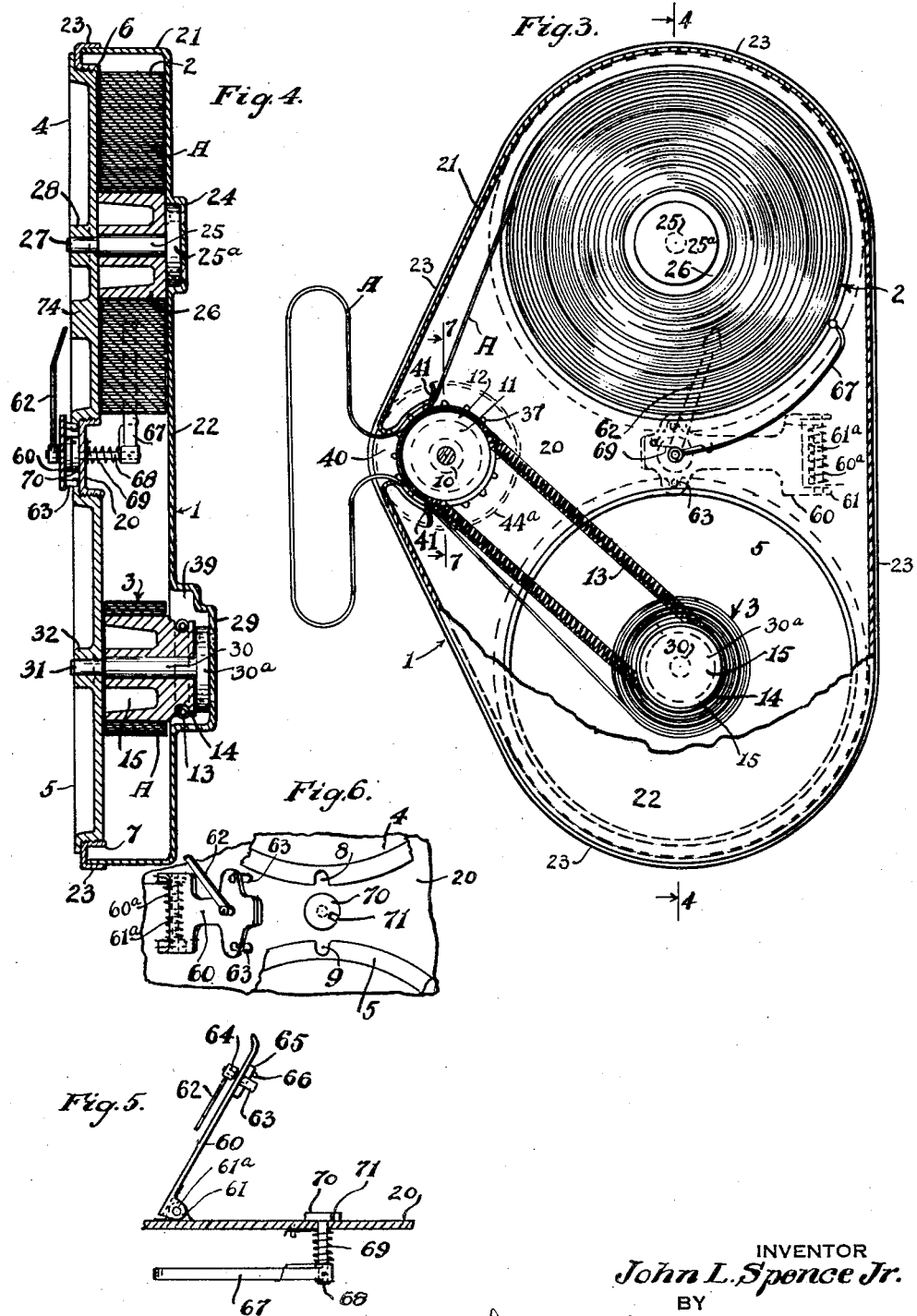

Patented Sept. 12, 1933

1,926,703

UNITED STATES PATENT OFFICE 1,926,703

MAGAZINE FOR MOVING PICTURE CAMERAS

John L. Spence, Jr., New York, N. Y., assignor, by mesne assignments, to Remac Patents Corporation, New York, N. Y., a corporation of New York Application March 14, 1931. Serial No. 522,574

5 Claims. (Cl. 88—17)

This invention relates to improvements in magazines for motion picture films and feed indicators for the said films; it consists in the novel features, which are hereinafter described.

One of the objects of the invention is to produce a perfected magazine for motion picture films, to be used for taking motion pictures with provision thereon of improved means for feeding the film into and out of the magazine and for the ready insertion thereinto and removal therefrom of the film reels.

Another object of my invention is to provide on said magazine a perfected mechanism and means for indicating on a suitable scale the length of film fed out of the magazine during a given length of time or for a certain exposure or operation of taking motion pictures.

A further object of my invention is to provide on said feed indicating mechanism a device whereby to return the pointer of the indicator to its zero position on the scale without disturbing the state of the indicating mechanism.

A still other object of my invention is to provide on said magazine a perfected means for indicating the length of unused film, which remains in the magazine after any given exposure or number of exposures.

Another object of my invention is to have my improved magazine for motion picture films and feed indicators for the same effective, simple, durable and comparatively inexpensive.

Other objects and advantages will hereinafter appear.

I attain these objects by the magazine for films and the mechanisms, associated therewith, which are illustrated in the accompanying drawings, or by any mechanical equivalents and obvious modifications of the same.

In the drawings,

Fig. 1 is a front elevation of one form of my improved film magazine, which encloses therein feed indicating mechanisms, which are hereinafter described, and has thereon on the front thereof pointers associated with said mechanisms, for indicating the length of film, which has been used and the length of film remaining unused in the magazine.

In this view part of the film is shown as forming a loop outside of the magazine, as it would when the film is being passed through a camera.

Fig. 2 is a side elevation of the magazine and parts associated therewith looking from right to left in Fig. 1.

Fig. 3 is partly a rear elevation and partly a vertical section of the side wall of the magazine, which is shown with the rear portion of the casing as broken away, thereby exposing to view the film spools and reels with the film drive mechanism and parts of the indicating mechanisms, which are hereinafter described.

Fig. 4 is a sectional view taken on the line 4—4 of Fig. 3, looking in the direction of the arrows.

Fig. 5 is a fragmentary part sectional bottom plan view taken on the line 5—5 of Fig. 1, looking in the direction of the arrows, and showing a pointer and parts of a mechanism for indicating the length of unused film, the arm supporting the pointer being shown in its open position, to permit the removal from the magazine of the reel passage covers, which are hereinafter described.

Fig. 6 is a detail in front elevation of the parts shown in Fig. 5 in the same relative positions thereof as shown in Fig. 5.

Fig. 7 is a fragmentary vertical sectional view taken on the line 7—7 of Fig. 3, looking in the direction of the arrows, showing the film driving sprocket, which is hereinafter described, and showing partly in elevation the mechanism for indicating the length of the film used; and Fig. 8 is a detail view in front elevation of the mechanism shown in Fig. 7, showing as broken away the part of the casing enclosing said mechanism.

Like characters of reference relate to like parts throughout the several views:

1 designates a magazine casing of suitable material enclosing therein supports for upper and lower reels of film 2 and 3 respectively; the upper reel 2 is generally known as the give off reel and the lower reel 3 is known as the take up reel.

The casing 1 has connected thereto an upper reel passage cover 4 and a lower reel passage cover 5; the covers 4 and 5 are shown in Fig. 4 as flanged and threadedly secured to inwardly extending sockets 6 and 7 respectively, which are provided in the front wall 20 of said casing 1.

Said covers 4 and 5 have thereon indents 8 and 9 respectively, for a purpose which is hereinafter described; said indents 8 and 9 are opposite each other, as shown in Fig. 6, when said covers 4 and 5 are screwed home in said sockets 6 and 7 of said casing.

The casing 1 has rotatably mounted thereon a shaft 10 which has secured thereto by means of a key 38, shown in Fig. 7 a film sprocket 11, which has made in one therewith a pulley 12 which is shown in Figs. 3 and 7 as engaged by a spring belt 13, which drives a pulley 14, which is integral with the spool 15 of the take-up reel 3, which is employed to wind up a film A as it is being unwound from the give-off reel 2. When the take-up obtains its drive by other means than through film sprocket 11, the sprocket may be a simple roller of proper diameter which the film, in passing over, causes to rotate and drive the film measuring unit 17.

The casing 1 has also connected thereto at the front thereof a mechanism 16 for indicating the length of the unused film, left on the give-off reel 2 and a mechanism 17 for indicating the length of used film which is being wound up by the take-up reel 3, after being used in making exposures for producing images thereon.

The mechanism 16 has thereon means for locking said covers 4 and 5 in position, as shown in Figs. 1 and 6, as is hereinafter more fully described.

The mechanism 17 comprises a train of worms and worm-gears, which are actuated by said shaft 10 of said sprocket 11.

As shown in detail in Figs. 3 and 4 the magazine casing 1 comprises a front wall 20, a side wall 21 and a rear wall 22, which is integral with the latter.

The front wall 20 of the magazine 1 has therein a pair of openings of an ample size for inserting and withdrawing therethrough reels of films; said openings are encompassed by said sockets 6 and 7, which are hereinbefore described.

Said front wall 20 has also thereon a rearwardly extending flange 23, which overlaps said side wall 21 and may be secured thereto by welding or in any other suitable manner.

The rear wall 22 of the magazine 1 has thereon in the upper part thereof a depression 24, which has housed therein and riveted thereto the flange 25a, which is formed at one end of a stud 25 and is integral with the latter.

The stud 25 has rotatably mounted thereon the spool 26 of the give-off reel 2, and said stud 25 terminates at the other end thereof in an offset portion 27, to fit a boss 28 on said cover 4, centrally thereof.

The lower part of said rear wall 22 has therein a depression 29, which has riveted thereto the flange 30a, which is formed at one end of a stud 30, which has rotatably mounted thereon the spool 15 of the take up film reel 3, and terminates at the other end thereof in an offset portion 31, which fits a boss 32 on said cover 5 centrally thereof.

Said shaft 10 may be driven by any suitable means and is shown in Fig. 7 as having at the ends thereof offset portions 33 and 34, which are rotatably mounted in openings 35 and 36 respectively of the front and rear walls 20 and 22 respectively of said magazine casing 1.

Said sprocket 11 has thereon teeth 37, for engaging openings 37a in said film A, whereby to feed the latter.

Said belt 13 is housed in a depression 39 in said rear wall 22, which is shown in Figs. 2 and 7.

The side wall 21 has therein at the central part thereof at one side of said casing 1 an opening 40, for passing therethrough the film A as it is being fed from said give-off reel 2 on said spool 26 outwardly by means of said teeth 37 on said sprocket 11, to be exposed in a camera; thereupon said film A is returned through said opening 40 to said sprocket 11 in said casing 1 and is fed thereby to the take-off reel 3 on said spool 15.

Said opening 40 is flanked with inwardly extending curved plates 41, which are formed by portions of said wall 21, which is parted at said opening 40; said plates 41 may be lined with felt or any other suitable material, and they serve to keep the film A with the openings 37a thereon in mesh with the teeth 37 of said sprocket 11.

As the film A is drawn out of the magazine 1 it is passed through a camera, wherein exposures of the film are made for a required extent of motion pictures; it has been found desirable to learn the length of the film, which has been exposed for any motion picture obtained or for any length of time of the exposure; I have therefore, provided the hereinbefore mentioned mechanism for indicating the length of used film, which mechanism comprises a train of worms and worm gears, which are shown at G in Figs. 1, 7 and 8, and actuate a pointer 42 to indicate the length of used film on a graduated scale 45, which is located on an extension of the casing 1. This extension includes a cover 44, and a housing 44a, which encloses the said mechanism G.

Said train of worms and worm gears is shown in detail in Figs. 7 and 8 and includes a worm 46, having thereon a hub 46a, which is secured to the offset end 33 of said shaft 10 and is in mesh with a worm gear 47, shown in Fig. 8, which is secured to one end of a counter shaft 48, which is rotatably supported by a bracket 49; the latter is secured by means of screws 50 to the front wall 20 of the magazine casing 1.

The counter shaft 48 has secured thereto at the other end thereof a worm 51, which is in mesh with a worm gear 52, which is rotatably supported by a shouldered screw 53, which is shown in Fig. 7 as secured to the front wall 20 of the magazine casing 1 and is located in a depression 54 in said gear 52.

The said gear 52 has thereon internal teeth 55, which have positioned therebetween the ends of resilient arms 56, which extend radially from a hub 56a, which is secured to the shaft or pin 57 of said pointer 42 thereby driving said shaft 57 with said pointer 42 thereon when said shaft 10 is revolving.

Said shaft 57 is rotatably supported by a bearing 58, which is secured to said cover 44, as shown in Fig. 7.

When taking motion pictures it is sometimes desirable to use a few feet of film for one subject and a few feet for another subject; and in such a case it is necessary to return the pointer 42 to the zero reading on said scale 45 after any desired length of said film A has been exposed; for this purpose the said resilient arms 56 are made flexible enough to allow their ends to pass over said teeth 55 in said gear 52, when said pointer 42 with said shaft 57 are turned by hand with relation to said gear 52, which is kept by the teeth or threads of said worm 51 from overhauling thereon. Pointer 42 might also be held in frictional engagement with its drive gear 52, friction being sufficient to retain pointer 42 in its proper relationship unless deliberately set back by hand.

The ends of said arms 56 do not move with relation to said teeth 55 when transmitting motion from said gear 52 to said shaft 57 with the pointer 42 thereon.

It has also been found necessary to learn the length of unused film, which remains in the magazine, and for this purpose I have provided the hereinbefore mentioned mechanism for indicating the length of unused film, which is shown in Figs. 3, 4, 5 and 6 and includes an arm 60, which is pivotally connected by means of ears 61 and a pin 61a to a part of the front wall 20 of the magazine casing 1, which is situated between said covers 4 and 5.

An initially stressed torsional spring 60a encompasses said pin 61a and has one end thereof connected to said wall 20 and the other end thereof to said arm 60, thereby tending to keep said arm 60 close to said wall 20 and to resist turning said arm on its pin 61a in a direction away from said wall 20.

Said arm 60 has near the outer end thereof a pair of locking pins 63, to engage said slots 8 and 9 in said covers 4 and 5 respectively, to keep the latter from being turned in their sockets 6 and 7 respectively, as hereinbefore described, when said arm 60 is in its working position.

Said arm 60 has pivotally mounted thereon near the outer end thereof a pointer 62 by means of a shaft 64, which is flanged at one end thereof as at 65, as shown in Fig. 5.

The flange 65 has therein an engaging pin 66, to fit into a slot 71 in a flange 70, which is provided at the outer end of a pin 68, which is pivotally mounted, as shown, in an aperture in said front wall 20 directly opposite said shaft 64 and has secured thereto at the other end thereof a film feeler arm 67, which is located in said magazine casing 1 and is kept in contact with said reel 2 by means of a torsional spring 69, which has one end thereof connected to said wall 20 and the other end thereof to said feeler arm 67, thereby tending to hold the latter with the outer end thereof in contact with the film of said reel 2.

The said pin 66 on the flange 65 of said shaft 64 is engaged by said slot 71 on the flange 70 of said pin 68 of the feeler arm 67; and, as the film is unwound from the reel 2 on said spool 26 the feeler arm 67 is turned with its end towards the center of the reel 2, thereby causing said pointer 62 to be turned in a way to indicate on a suitable scale 74, the length of film which is left on the reel 2.

Said scale 74, which is shown in elevation in Fig. 1 of the drawings, may be formed on a raised portion of said cover 4, as shown in section in Fig. 4.

It might be advisable to reverse the action of spring 69 to hold arm 67 away from the film to prevent rubbing contact, measuring to be accomplished by manually moving pointer 62 until arm 67 rests on film roll 2 and reading the position of the pointer on scale 74.

Said covers 4 and 5 are also provided with raised thumb portions 75 which are shown in Fig. 1 for turning said covers into and out of their sockets 6 and 7 when reloading the magazine.

Many changes may be made in the details of my magazines for motion picture films and feed indicators for the same without departing from the main scope of my invention, and parts of my invention may be used without other parts.

I do not therefore restrict myself to the details as shown in the drawings, but I intend to include all mechanical equivalents and obvious modifications of the same within the scope of my invention.

I claim:

1. A film magazine comprising in combination front and rear walls having supply and take up film reels disposed therebetween, a sprocket wheel revolvably disposed between said walls for driving the film between said reels, said wheel including annular rows of teeth, a side wall disposed between the outer boundary edges of said first walls and providing a film opening at said sprocket, and a pair of curved terminals integral with said latter wall and disposed between said rows of teeth for guiding the film during revolution of said sprocket, there being apertures in the film for said teeth.

2. In a film magazine comprising a casing having therein a rotary shaft and a film winding spool operated by said shaft, there being between the latter and said spool a flexible connection, means for indicating the amount of film wound on said spool, said means including an extension on said casing, said extension having therein an aperture, a terminal of said shaft disposed in said extension, a worm rigid with said terminal, a shoulder screw carried by said casing in said extension, a worm gear revolvably mounted on said screw, a pin carried by said gear and having an end projecting through said aperture, a scale on said extension, an arm rigidly mounted on said end and including a pointer, a bracket disposed within said extension, a shaft revolvably mounted on said bracket, a worm carried by one end of said latter shaft and meshing with said first gear, and a worm gear carried by the other end of said second shaft and meshing with said first worm, whereby revolution of said first shaft is effective to turn said pin on its axis for moving said pointer over said scale.

3. A mechanism according to claim 2 in which said arm is manually movable backwardly for step-by-step film winding indication.

4. A mechanism according to claim 2, in which means are provided whereby said arm is movable backwardly for step-by-step film winding indication, said means including internal teeth on said first worm gear, and resilient arms extending from said pin and movably engaging said teeth.

5. In a film magazine comprising a casing having therein film supply and take-up reels, said casing having in the wall thereof an aperture, means for indicating the amount of film in said first reel, said means including a scale on said casing, an arm mounted on said casing, a shaft revolvably mounted on said arm and having thereon a flange, a pointer rigid with said shaft, a pin disposed within the casing and having one terminal turnably extending through said aperture, an external flange on said terminal, said latter flange having therein a slot, another arm rigid at one of its ends with the other terminal of said pin and having its other end movably engaged on said first reel, spring means urging said latter end against said reel, and another pin carried by said first flange and disposed in the slot of said second flange, whereby movement of said second arm, responsive to variation of the diameter of said first reel, may be effective to move said pointer along said scale.

JOHN L. SPENCE, Jr.